No. 784,013. PATENTED FEB. 28, 1905.
W. STANLEY.
METHOD OF GENERATING LOW FREQUENCY CURRENTS.
APPLICATION FILED JULY 7, 1904.

Witnesses
Geo. V. Rasmussen
L. Vreeland

Inventor
WILLIAM STANLEY
By his Attorney

No. 784,013. Patented February 28, 1905.

UNITED STATES PATENT OFFICE.

WILLIAM STANLEY, OF GREAT BARRINGTON, MASSACHUSETTS.

METHOD OF GENERATING LOW-FREQUENCY CURRENTS.

SPECIFICATION forming part of Letters Patent No. 784,013, dated February 28, 1905.

Original application filed November 11, 1903, Serial No. 180,641. Divided and this application filed July 7, 1904. Serial No. 215,591.

*To all whom it may concern:*

Be it known that I, WILLIAM STANLEY, a citizen of the United States, residing at Great Barrington, county of Berkshire, and State of Massachusetts, have invented certain new and useful Improvements in Methods of Generating Low-Frequency Currents, of which the following is a full, clear, and exact description.

My invention relates to methods of producing alternating currents, especially such currents as are of low periodicity, and has for its object to provide an efficient method for producing currents of considerable volume without the use of apparatus which is abnormally large or expensive.

Heretofore it has been impossible to generate currents of low periodicity without using apparatus which was unduly large and expensive in comparison with the electric energy produced. This was on account of the necessarily slow speeds employed in revolving the armature or field of the machine so as to produce the required frequency. Thus if one wishes to produce currents of a frequency of five periods per second by the ordinary method of causing a magnetic field to traverse coils wound upon an armature the rate of relative motion of such field is necessarily as low as three hundred revolutions per minute, this being the rate required when a bipolar machine is used and two poles being the smallest number that can be employed in an alternating-current generator. By using my method the frequency of the generator is made independent of the speed of revolution of the armature in which the currents are induced. The apparatus may therefore be of normal size. The frequency, moreover, may be varied over wide limits without changing the speed of the induced element of the machine.

The following is a description of apparatus employed by me for carrying out my invention, reference being had to the accompanying drawings, in which—

Figure 1:
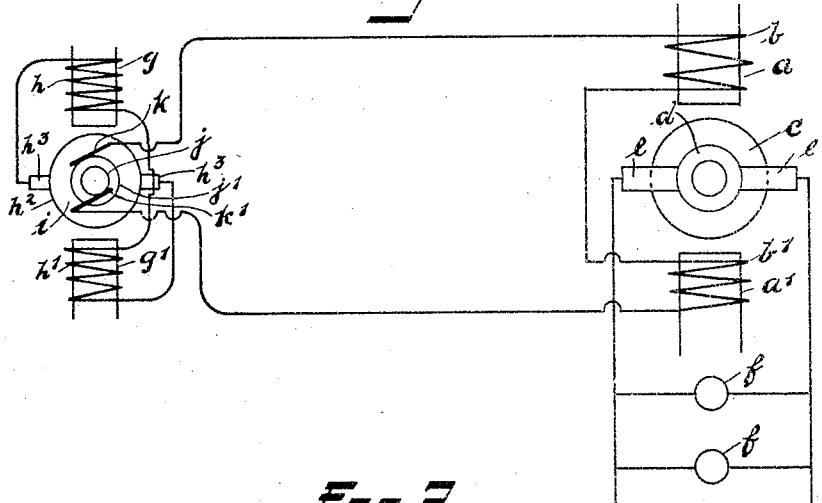
Figure 2:
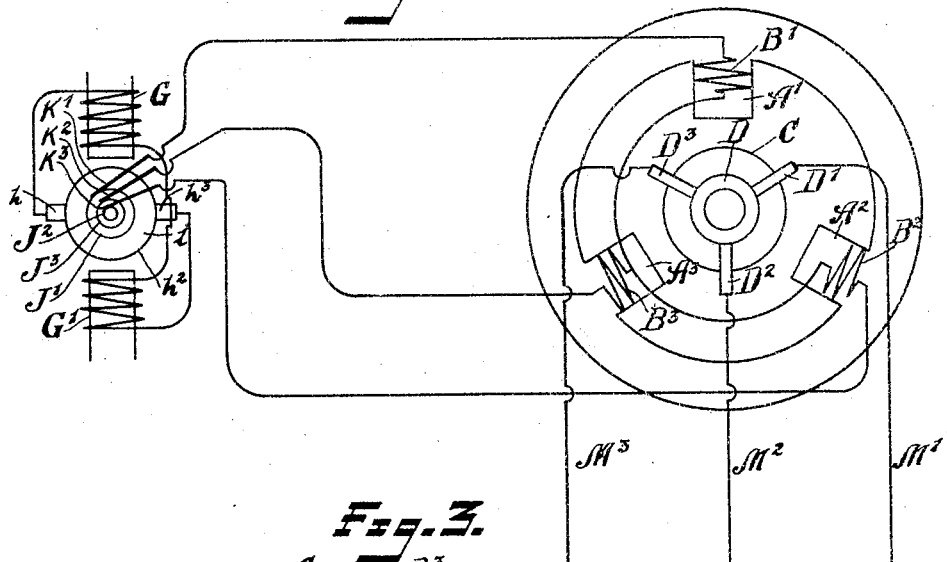
Figure 3:
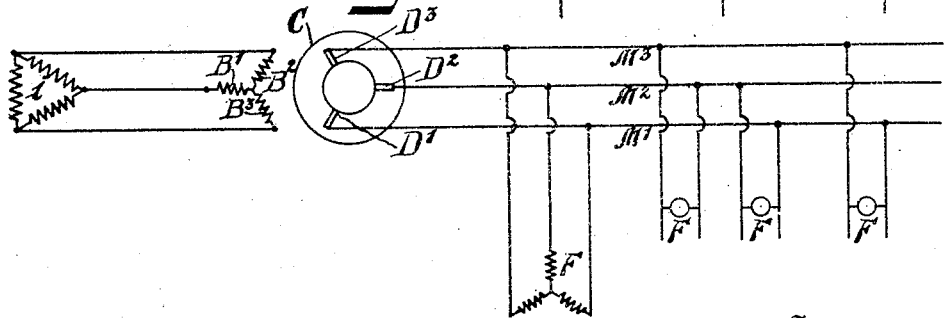

Figure 1 shows a simplified form of such apparatus. Fig. 2 shows a form for generating three-phase currents, and Fig. 3 is a diagram of circuits.

Referring more particularly to the drawings, in Fig. 1 $a\ a'$ are the field-magnet poles of a bipolar generator laminated in the manner usually found where fluctuating or alternating currents are employed. $b\ b'$ are the energizing-windings upon this field-magnet. $c$ is an armature such as ordinarily found in a continuous-current machine with a Gramme or other closed winding connected to a commutator-cylinder $d$ of the usual type and revolving within the field of the magnet-poles $a\ a'$. $e\ e$ are brushes bearing upon the commutator-cylinder, from which lead conductors to the translating devices $f$. The energizing-windings $b\ b'$ are supplied by alternating currents of low frequency from a small alternating-current exciter having field-magnet poles $g\ g'$, energized by windings $h\ h'$, supplied with continuous currents from the commutator $h^2$, on which bear collecting-brushes $h^3\ h^3$ and an armature $i$, the winding on which is connected to slip-rings $j\ j'$, upon which bear brushes $k\ k'$, connected to the mains leading to the windings $b\ b'$. The exciter is run at such a speed as will give a current of the desired frequency. Inasmuch as the only work that this exciter is called upon to do is to supply a magnetizing-current to the windings $b\ b'$, it may be made small in size and yet generate the requisite current. In operating this system the exciter is operated to generate alternating currents of the desired periodicity, which are fed to the energizing-windings $b\ b'$. This produces an alternating magnetic field between the poles $a\ a'$ of the field-magnet. The armature $c$ is then caused to revolve within this alternating field at a rate such as will generate the desired electromotive forces to supply the desired volume of current. The result will be that the electromotive forces impressed upon the brushes bearing upon the commutator will rise and fall with the fluctuations of magnetism in the field-magnet and will produce an alternating current having the frequency of that of the exciter. The small energy which this exciter is called upon to furnish enables that machine to be made small in size, and the high speed at which the generator can be run enables it to be made of comparatively small size.

In Fig. 2 I have shown a means for producing three-phase alternating currents of low periodicity from a single generator. A' A² A³ are three polar projections of a field-magnet provided with energizing-windings B' B² B³. Within the field existing between the polar projections A' A² A³ revolves the armature C, having an ordinary Gramme winding and provided with a commutator D, upon which bear brushes D' D² D³. From these branches lead three conductors M' M² M³ for supplying the current to the translating devices F. G G' are magnet-poles of a low-frequency three-phase exciter from the collecting-rings J' J² J³, of which three-phase currents of low frequency are taken by the brushes K' K² K³, which are connected to the windings B' B² B³. This exciter since its load is always small can be made of small size in spite of the low frequency of the current generated. The currents obtained from the brushes B' B² B³ depend upon the speed at which the armature C is driven, except so far as their frequency is concerned, which is determined by the frequency of the exciter. The generator can therefore be made of normal size for the amount of electric energy supplied in spite of the low frequency which it is to furnish. The polar projections A' A² A³ become successively positive and negative, and the brushes D' D² D³ become successively positive and then negative poles of the outgoing circuits and lead from the machine alternating multiphase currents corresponding in frequency to the frequency impressed upon the field system by the exciter. In a similar manner two-phase or other multiphase generators may be constructed which will furnish alternating currents corresponding in frequency to the frequency impressed upon the field system.

In carrying out my method of generating multiphase currents I may impress the low-frequency magnetizing-currents upon the field to produce an apparent rotating field either in the same or in a direction opposite to that of the revolution of the armature, and thereby give to the generator in these two cases the peculiar characteristics of either an overdriven or underdriven machine.

This is a division of my application, Serial No. 180,641, filed November 11, 1903.

What I claim is—

1. The method of obtaining low-frequency alternating currents which consists in setting up an alternating field by currents of the desired low frequency, inducing thereby by aid of mechanical motion currents of different frequency and commutating the frequency of such currents to that of the exciting-currents.

2. The method of obtaining low-frequency alternating currents which consists in setting up an alternating magnetic field of low periodicity, rotating an armature therein and collecting by means of a commutator the currents induced in said armature.

3. The method of obtaining low-frequency alternating currents which consists in generating alternating currents of low periodicity, setting up an alternating magnetic field thereby, rotating an armature therein and collecting by means of a commutator the currents induced in said conductor by such rotation.

4. The method of obtaining low-frequency alternating currents which consists in generating phase-differing alternating currents of low periodicity, setting up thereby phase-differing alternating magnetic fields, revolving an armature through said fields and thereby generating phase-differing alternating currents corresponding to the phases and periodicities impressed upon the field and conducting such multiphase currents from the armature by means of a commutator and brushes.

Signed at Great Barrington, Massachusetts, this 5th day of July, 1904.

WILLIAM STANLEY.

Witnesses:
HAROLD STANLEY,
LEONARD LOVEJOY STANLEY.

---

Correction in Letters Patent No. 784,013.

It is hereby certified that in Letters Patent No. 784,013, granted February 28, 1905, upon the application of William Stanley, of Great Barrington, Massachusetts, for an improvement in "Methods of Generating Low-Frequency Currents," an error appears in the printed specification requiring correction, as follows: In line 19, page 2, the reference letters and numerals "B¹ B² B³" should read $D^1 D^2 D^3$; and that said Letters Patent should be read with this correction therein that the same may conform to the record of the case in the Patent Office.

Signed and sealed this 14th day of March, A. D., 1905.

[SEAL.]

F. I. ALLEN,
*Commissioner of Patents.*